United States Patent [19]

Hwang

[11] Patent Number: 5,648,754

[45] Date of Patent: Jul. 15, 1997

[54] WIRELESS CAR SECURITY SYSTEM

[76] Inventor: Shih Ming Hwang, 1F., 10, Lane 31, Chung Teh St.,, Taipei, Taiwan

[21] Appl. No.: 558,698

[22] Filed: Nov. 14, 1995

[51] Int. Cl.[6] .......................... B60R 25/10; B60R 25/00
[52] U.S. Cl. .......................... 340/426; 340/428; 340/542; 340/825.36; 307/10.2; 180/287
[58] Field of Search .......................... 340/426, 428, 340/430, 542, 425.5, 825.3, 825.31, 825.36; 307/10.2; 180/287

[56] References Cited

U.S. PATENT DOCUMENTS

| 3,986,166 | 10/1976 | Kohn | 340/428 |
|---|---|---|---|
| 4,038,635 | 7/1977 | Schotz | 340/428 |
| 4,174,516 | 11/1979 | Cleary | 340/428 |
| 4,658,237 | 4/1987 | Williamson | 340/426 |
| 4,749,873 | 6/1988 | Mutoh et al. | 307/10 |
| 4,885,572 | 12/1989 | Iwata et al. | 340/425.5 |
| 4,933,664 | 6/1990 | Igawa et al. | 340/425.5 |
| 5,003,287 | 3/1991 | Peters | 340/428 |
| 5,128,650 | 7/1992 | Peters | 340/428 |
| 5,132,660 | 7/1992 | Chen et al. | 340/426 |
| 5,247,279 | 9/1993 | Sato | 340/426 |
| 5,420,568 | 5/1995 | Iida et al. | 340/542 |
| 5,469,151 | 11/1995 | Lavelle et al. | 340/426 |
| 5,539,377 | 7/1996 | Dillon | 340/426 |

*Primary Examiner*—Brent A. Swarthout
*Assistant Examiner*—Van T. Trieu
*Attorney, Agent, or Firm*—Bacon & Thomas

[57] ABSTRACT

A car security system capable of sending out an alarm when a car door is opened by an unauthorized person comprises a power stabilizing circuit for providing working DC power for the security system, a signal amplifying circuit for detecting small voltage change signals in the car battery and for generating therefrom an amplified signal, an alarm circuit including a buzzer and a controlling transistor, a microprocessor for receiving and then evaluating the amplified signal. In operation, when a car door is opened, a voltage change signal is produced, which is then detected for evaluating whether the opening of car door is authorized. If a voltage change signal is detected during conditions other than the car door opening, it is identified as a false alarm.

2 Claims, 3 Drawing Sheets

WIRELESS CAR SECURITY SYSTEM

BACKGROUND OF THE INVENTION

The present invention relates to a car security system, and more particularly to a car security system composed of simple circuits, capable of identifying complex signals and detecting unauthorized opening of a car door.

Various conventional car security systems are commercially available at different prices. These security systems are designed with different structures and functions. The mechanical types of car security devices are the most popular ones, such as steering wheel lock, shift lever locks, etc. With respect to electronic car security systems, various expensive detectors are used, such as infrared detector, ultrasonic wave detector, etc. In addition, some of the car security systems are vibration types of security system, including both electronic and mechanical elements. Such a security system is relatively low priced. However, false alarms frequently occur when such security systems are used. Therefore, such security systems are not practical. In addition, when installing the electronic security system, the intrusion or motion detector thereof must be mounted at a suitable position which is often spaced a certain distance from a controller of the security system. Therefore, the detector must be connected to the controller by wiring running some distance through the car. This complicates the installation of the security system and makes the system liable to be interfered with and cause a false alarm.

Therefore, it is necessary to provide a car security system which will eliminate the above shortcomings existing in conventional car security systems.

SUMMARY OF THE INVENTION

It is therefore a primary object of the present invention to provide a car security system which is capable of identifying voltage change patterns in the car battery, and thereby detect an unauthorized opening of a car door. Moreover, the installation of the security system can be accomplished by connecting it directly to the battery without requiring wiring between the security system, which may be adjacent to the car battery, and switches in the car doors. The security system of the present invention can be used in combination with many other security devices, or be independently used.

The structural feature and advantages of the present invention, and the technical means adopted to achieve the present invention, can be best understood through the following detailed description of the preferred embodiment and the accompanying drawings wherein:

DETAILED DESCRIPTION OF THE PREFERRED EMBODIMENT

Figure 1:
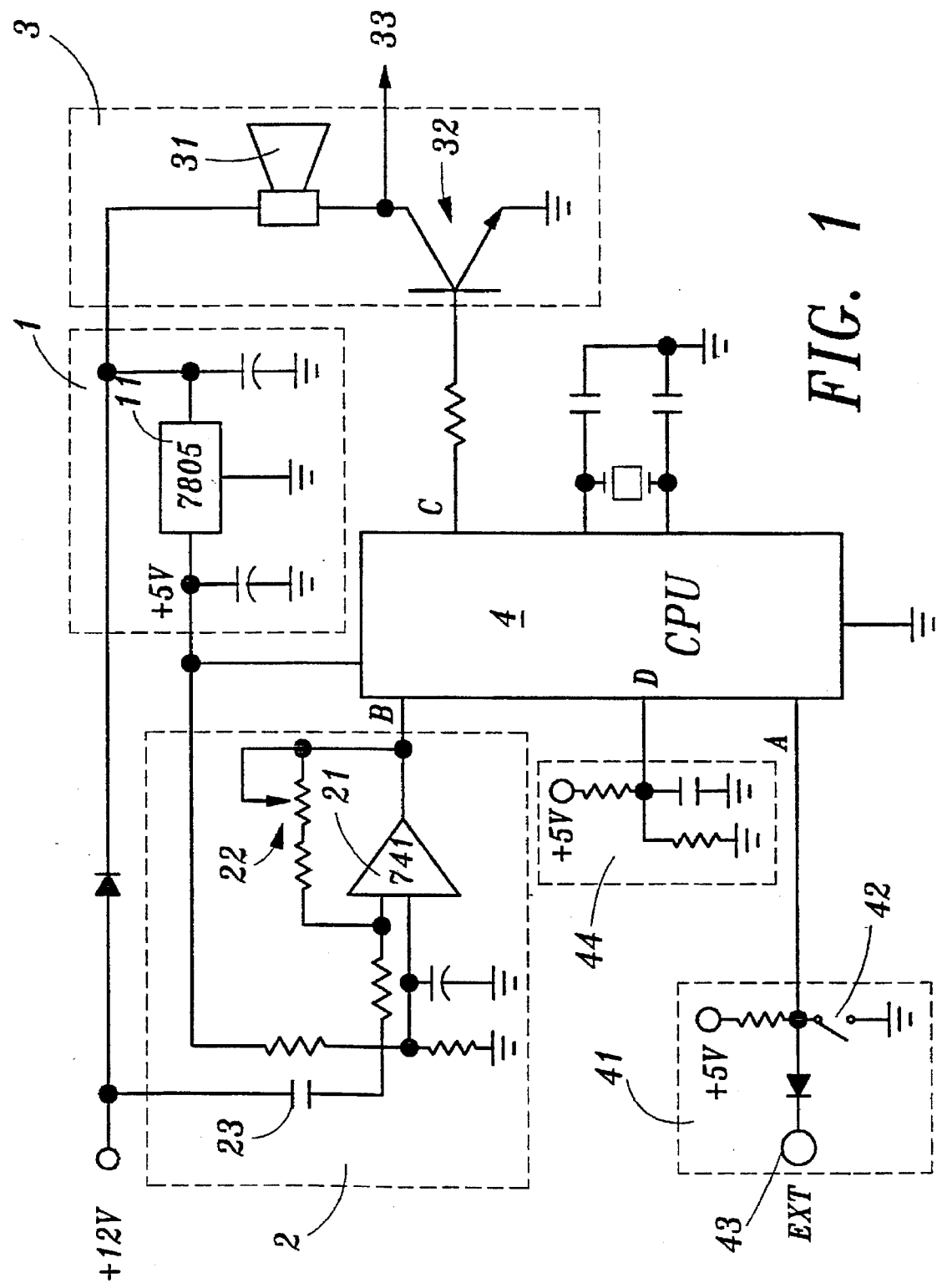
FIG. 1 is a circuit diagram of the present invention.

Please refer to FIG. 1, which shows the circuit of the present invention, including mainly a power stabilizing circuit 1, a signal amplifying circuit 2, an alarm circuit 3 and a microprocessor 4. The power stabilizing circuit 1 provides the necessary working DC power for the security system of the present invention. The power for the security system is supplied by a car battery. Exemplifying the embodiment of the present invention, the working voltage is 5 VOLTS, so that a stabilizing IC 7805 11 will be enough to provide a stable voltage of 5 VOLTS. The signal amplifying circuit 2 is composed of an OP 741 IC 21 serving as an amplifier and a changeable resistor 22 controlling the amplifying rate thereof and taking out any small voltage-changing signal of the battery. When the battery is activated to supply power, a relatively large activating current is produced and an instant change of the voltage of the battery takes place. When opening a car door, a certain amount of electricity is used, so that a certain voltage-change signal of the battery is produced for the security system to detect and identify whether the car door is being opened and whether such opening is authorized. The alarm circuit 3 is composed of a buzzer 31 and a controlling transistor 32. In case an unauthorized opening of the car door is detected, a controlling signal is sent to the controlling transistor 32 to power on the same, so as to make the buzzer 31 emit an alarm sound. The controlling transistor can be connected to external circuit 33, such as a wireless transmitter, to transmit a signal to a user for achieving optimal security effect.

Figure 2:
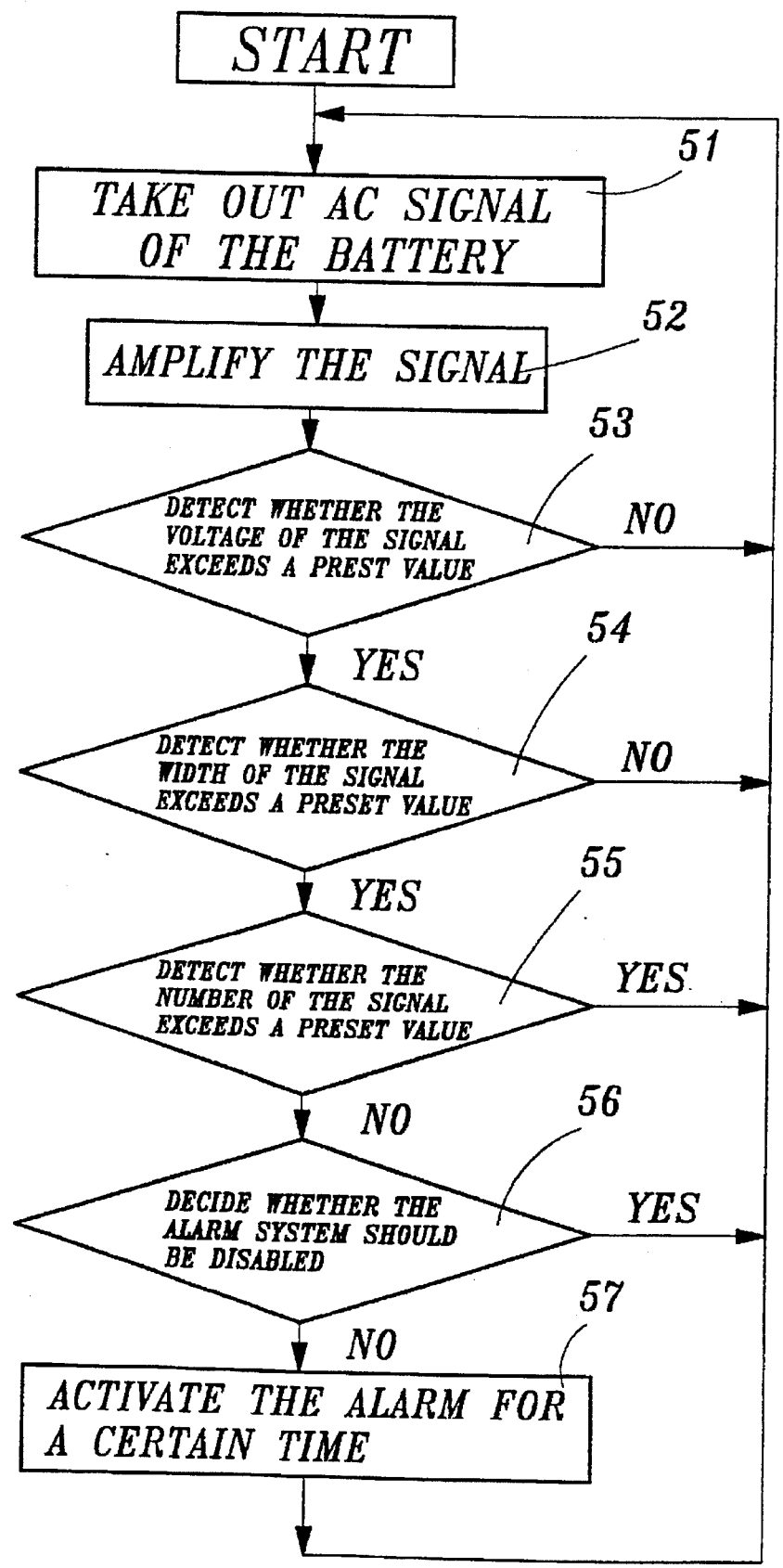
FIG. 2 is a working flow chart of the present invention.

Please refer to FIG. 2, which shows the working procedure of the present invention. The microprocessor 4 is used to control the working of the present invention. The signal amplifying circuit 2 transmits an AC change signal of the battery to the microprocessor 4 in such a manner that a coupling capacitor 23 stops DC signals and permits only AC change signal of the battery to enter the amplifying circuit 2 (51 of FIG. 2) to be amplified and sent to the microprocessor 4 (52 of FIG. 2). The microprocessor 4 immediately judges whether the voltage-change signal possess the required microprocessor-stored characteristics indicating a car door being opened. Specifically, if the voltage-change signal exceeds a preset amplitude value 53 which is set according to the requirements of different types of cars and customers, so that a false judgement of the present invention is rare. If the signal does not exceed the preset value, then the signal may be a noise and can be disregarded. If the signal amplitude exceeds this preset value 53, then it will be judged whether the period of the signal exceeds the preset value 54. If not, it can be disregarded. If so, it has then to be judged whether the number of occurrences exceeds a present number 55 within a present period of time, typically one second. If the period of the pulse signal is within one second, then the pulse signal is a car door opening signal. If the period is over one second, then it means that the car was started or the engine fan was operated or the buzzer was activated. Such conditions are disregarded. Only one pulse signal is produced in case of opening the car door, and the car door cannot be opened twice within one second. If the preset number is not exceeded, then it will be judged whether the alarm system should be disabled. It is judged whether the opening of the car door is authorized. If so, the alarm system is disabled and no alarm is emitted. If not, the alarm system activates the alarm 57 for a predetermined time to prevent the car from being stolen.

Please further refer to FIG. 1. An alarm disabling means 41 of the present invention is controlled by a switch 42 or an external signal 43. The switch 42 can be installed on a car door lock while the external signal 43 can be installed on a remote controller. In addition, a resetting means 44 is used for activating the present invention while keeping the system normally operating. Also, the resetting means 44 can reset the system at predetermined time intervals so as to avoid abnormal operation of the system due to external interferences such as thunder and wireless disturbance. Therefore, in case of failure of the microprocessor, the security system can be reset to work normally. The resetting time of the resetting means 44 is determined by the charging and discharging of the resistor and capacitor.

Figure 3:
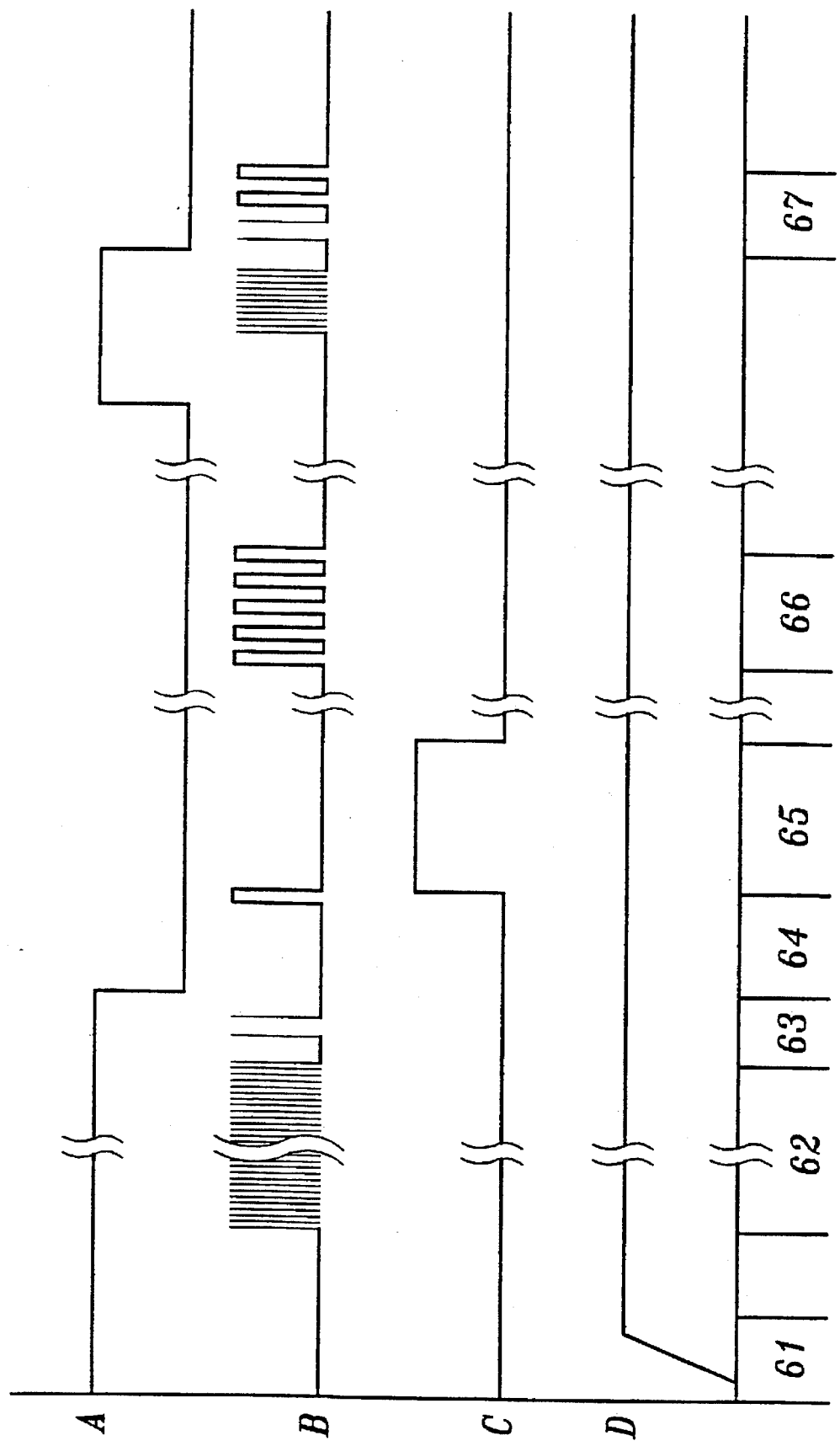
FIG. 3 shows the wave pattern of each point of the circuit of the present invention.

For better illustrating the operation of the present invention, the wave pattern of each point of the circuit of FIG. 1 is shown in FIG. 3, wherein point A is the wave pattern of the alarm disabling means 41, point B is the output wave pattern of the signal amplifying circuit 2, point C is the pattern of the wave output to the alarm circuit 3, while point D is the output signal wave pattern of the resetting means 44. In 61 of FIG. 3, the security system is re-activated. At this time, the wave pattern of charging of the capacitor will only occur at point D, and point A is in an alarm-disabled state. In 62 of FIG. 3, the car is being started. At this time, many pulses are produced at point B because the running of the engine will affect the power of the battery. In 63 of FIG. 3, the car is stopped and a few pulse waves are produced at point B. In 62 and 63, the microprocessor will identify that these signals are not those for activating the alarm. In 64, the alarm system is set. In 65, the alarm is activated. At this time, the microprocessor first detects the door-opening signal at point B and judges that the point A is in the alarm-setting state. The microprocessor immediately identifies that the dooropening movement is unauthorized and sends out a controlling signal from point C to the alarm circuit, making the buzzer emit an alarm sound. In case the car is parked under strong sunlight, the fan will operate, due to excessively high temperature. At this time, as shown in 66, pulse signals caused by the fan will occur at point B. In addition, when the car has just been stopped and the engine is still hot with the fan still operating, as shown in 67, pulse signals caused by the fan will still occur at point B. These two kinds of pulses caused by the fan are disregarded by the present invention, to avoid false alarm.

According to the above, the microprocessor of the present invention can detect the number of the pulses within a certain time and identify whether the pulses occur evenly. Moreover, the present invention can allow an error of the number of the pulses and detect whether the width and height of the pulses are even and continuous, to decide whether the alarm should be activated.

It is to be understood that the above description and drawings are only used for illustrating one embodiment of the present invention, and are not intended to limit the scope of the present invention. Any variation and derivation from the above description and drawings should be included in the scope of the present invention.

What is claimed is:

1. A car security system, for a car having a car battery, comprising:

a power stabilizing circuit means for providing working DC power for said security system;

an alarm disabling means for disabling the security system under the control of an authorized user;

a signal-amplifying circuit means connected to the car battery for detecting voltage changes in the car battery and for generating an amplified signal, said signal-amplifying means including a coupling capacitor connected between the battery and a signal amplifying circuit for blocking DC signals and ensuring that the amplified signal is representative of voltage changes;

an alarm circuit means including a buzzer which emits an alarm sound;

a microprocessor means connected to the signal-amplifying circuit means and to the alarm circuit means for receiving the amplified signal from the signal-amplifying circuit means, for evaluating the amplified signal and comparing the signal to microprocessor-stored characteristics indicative of the opening of a car door, and for activating the alarm circuit means when said amplified signal is evaluated as corresponding to opening of said car door and the security system is not disabled;

wherein, when said car door is opened, a characteristic voltage change signal of the battery is produced, having specific characteristics recognizable by the microprocessor means as indicating the opening of said car door, and if the security system has not been disabled, the microprocessor means upon identifying the signal as the opening of said car door activates the alarm circuit means to cause the buzzer to emit said alarm sound.

2. The system of claim 1, wherein the alarm disabling means comprises means connected to the microprocessor means for receiving a remote, wireless signal, and means in the microprocessor means for disabling the alarm circuit means in reponse to receipt of said wireless signal.

* * * * *